Oct. 23, 1934.  W. A. McKINLEY  1,978,055
VEHICLE FRAME
Filed Feb. 24, 1931   2 Sheets-Sheet 1

Inventor
William A. McKinley
By Macklin, Soule & Leonard
Attorneys

Oct. 23, 1934.    W. A. McKINLEY    1,978,055
VEHICLE FRAME
Filed Feb. 24, 1931    2 Sheets-Sheet 2
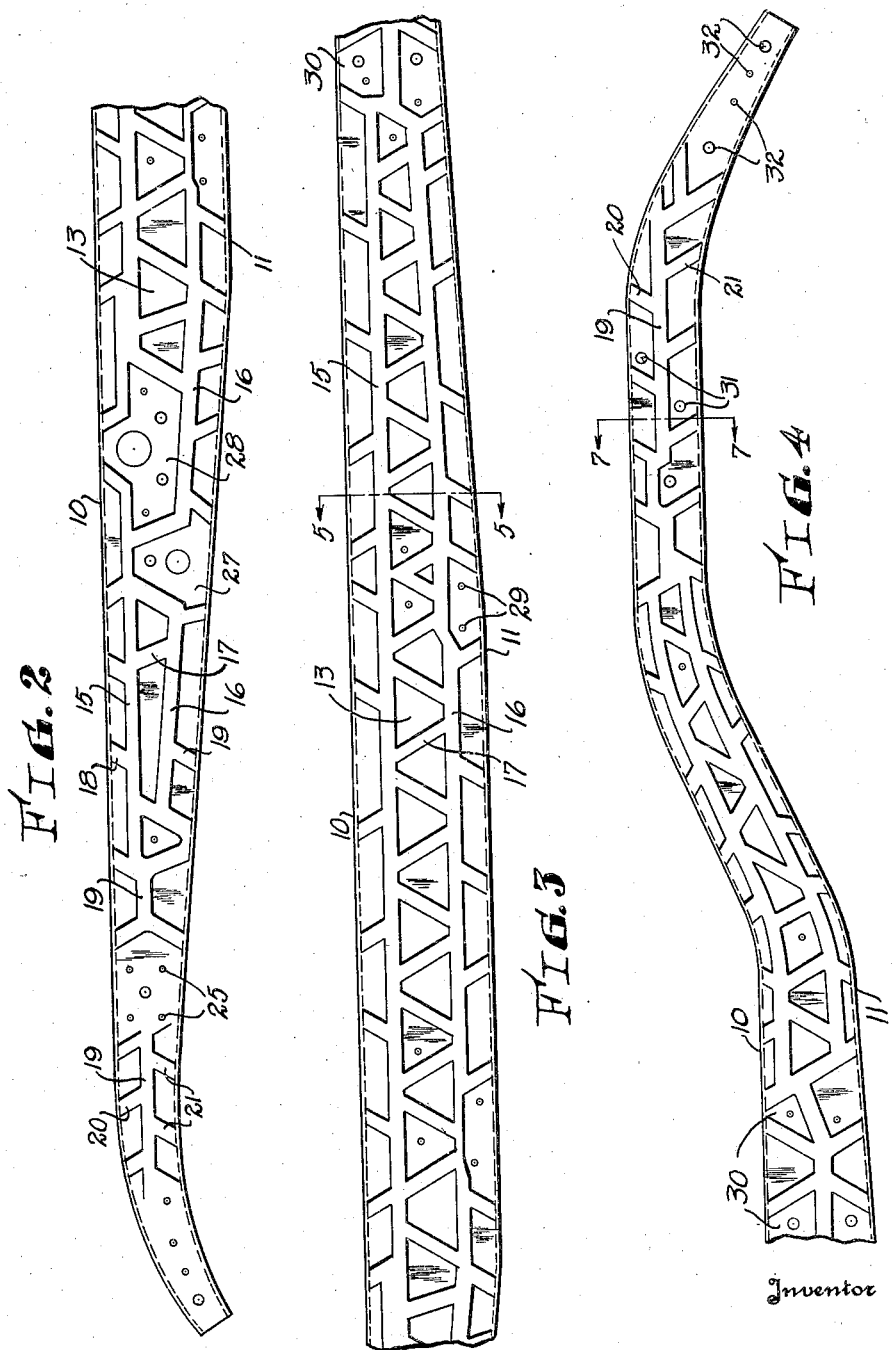

Patented Oct. 23, 1934

1,978,055

UNITED STATES PATENT OFFICE 1,978,055

VEHICLE FRAME

William A. McKinley, Detroit, Mich., assignor to The Midland Steel Products Company, Cleveland, Ohio, a corporation of Ohio Application February 24, 1931, Serial No. 517,722

13 Claims. (Cl. 280—106)

The essential object of this invention is to provide an improved automobile chassis side frame member, which shall be considerably lighter in weight, and which affords certain economies because of the use of lighter material, strengthened to resist the usual or greater loads by the methods of the present invention.

The side frame element shown in the drawings is of a general class now in almost universal use, being supported at the front and rear by two semi-elliptical springs and connected with a corresponding member forming the other longitudinal side frame beam of an automobile chassis. The loads applied to a chassis frame are both vertical and torsional and an object of the present invention is to so strengthen the side frame members with relation to the cross frame members and loads applied thereto, that a much lighter material, that is, sheet steel of which the frame members are pressed may be used, affording economies while still offering greater resistance to the vertical loads in direct relation to the points of application of strain, as well as additionally resisting torsional strains due mainly to a greater impact or load being imposed upon the frame at either single front or rear spring. An example, is when one rear wheel passes over a sudden rise or obstruction.

A still further object of the invention is to so strengthen the side frame members with relation to the points of attachment of the cross frame members and springs, that the greatest possible rigidity of the individual members against the vertical load and direct twist application of force on the channel members applied by the cross members may be resisted, at the same time making use of the normal strengthening resulting from the attachment of the bracketed ends of the cross members.

A further object is to strengthen a beam, such as a pressed steel channel, by ribbing in a manner somewhat corresponding to a cantilever arrangement, to obtain maximum strength with minimum distortion of the sheet metal stock.

When a frame member is made of a single piece of sheet metal, obviously there can be no more than two horizontal edge flanges, and when the gauge of the metal is considerably decreased from standard practice, these horizontal flanges are much less effective in preventing lateral bending and twisting movement of the frame channels. To compensate for the decreased flange thickness, except where adequate support against torsional strains is provided by the bracketed cross members as mentioned, I provide longitudinally extending ribs pressed up from the sheet metal of the web, and to further strengthen and internally brace the web for vertical as well as lateral loads, I provide cross ribs connecting the longitudinal ribs and preferably others, hereinafter termed "joining" ribs, extending outwardly from the longitudinal ribs toward the adjacent flanges.

Further objects and features of my invention will become apparent from the following description relating to the accompanying drawings wherein I have shown my preferred form. The essential characteristics are summarized in the claims.

Referring briefly to the drawings, Fig. 1 shows a frame in side elevation together with a corresponding vertical bending moment diagram.

Figs. 2, 3 and 4 are fragmentary side elevations of a frame member made in accordance with my invention, the three fragments contituting one complete side frame element.

Figure 1:
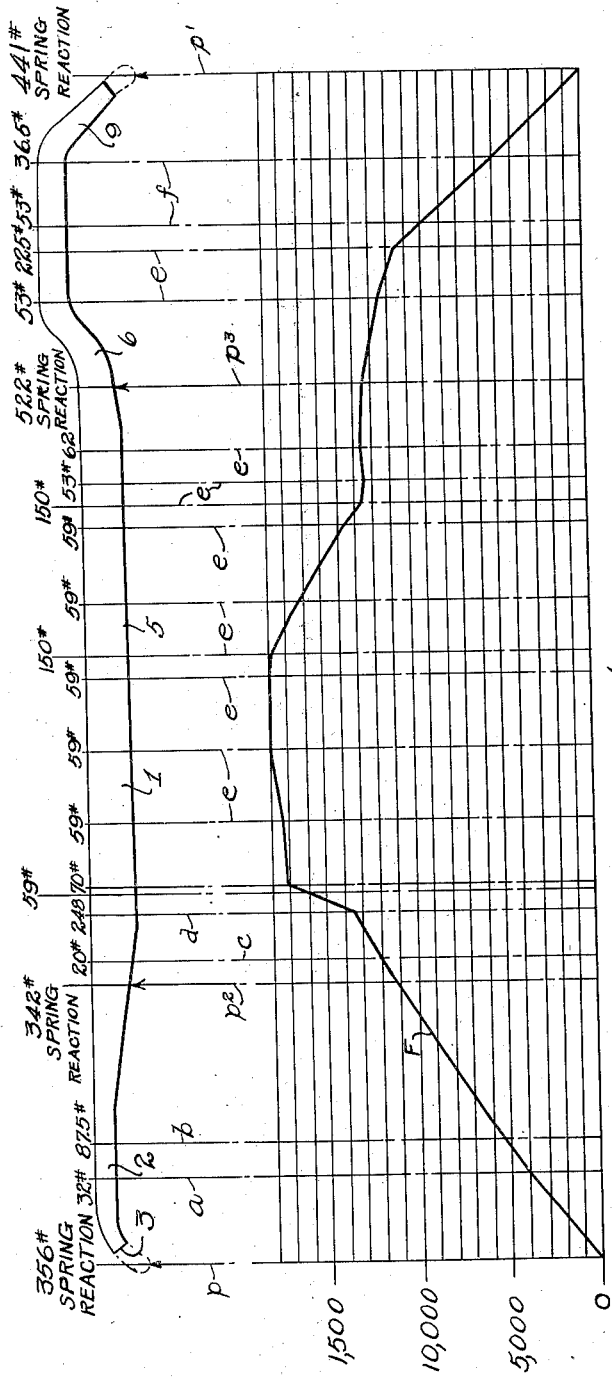
Figure 7:
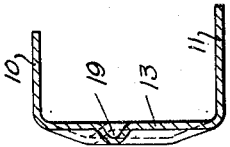
Fig. 7 is a transverse cross sectional view as indicated by the line 7—7 on Fig. 4.
Figure 6:
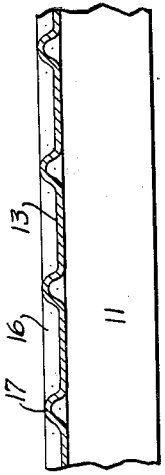
Fig. 6 is a longitudinal cross sectional view in a horizontal plane as indicated by the line 6—6 on Fig. 5.

Referring again to the drawings, and first to Fig. 1, 1 indicates a side frame member or beam which has kick-ups or arch shaped portions at each end bridging across the respective points of the support (at the spring shackles). The front arched portion is designated 2. The depth of the beam from the portion 2 becomes gradually greater attaining its maximum depth at 5, which continues throughout the major portion of the beam, to the rearward arch or kickup which begins at 6 where the vertical dimensions are seen to diminish gradually toward the downwardly curved end 9. The vertical broken lines on the force diagram represent for the most part arbitrary points at which localized load may be said to be imparted to the beam. The lines $p$ and $p^1$ however, represent the points of support at respective ends of the beam and the lines $p^2$ and $p^3$ represent the points of support intermediate the ends of the beam by reason of the rear shackle of the front spring and the front shackle of the rear spring respectively. The other vertical lines represent points at which predetermined or estimated loads concentrate; the vertical line $a$, for example, represents the radiator load; vertical line $b$ the front end of the motor; line $c$ the steering gear; line $d$ the rear end of the motor; lines $e$ passenger and body loads; and lines $f$ gasoline tank and spare tire loads. The resultant increment of bending moments in inch pounds is indicated by the line F which it will be seen begins at zero and increases to its highest point between the second and third body load lines $e$ and then decreases to zero in a succession of more or less gradual steps toward the line $p^1$. The relation of the strengthening elements in the beam to the resultant stresses as above pointed out will be later explained.

No force diagram for torsional loads on the side frame members is illustrated, such loading depending very largely on road conditions, etc., which are more or less unknown factors. It is sufficient to say that these loads are applied whenever one side frame beam, or portion thereof, is moved or given a tendency to move either vertically or otherwise with reference to the other beam, and that such load is imparted to both beams at the points of attachment of the cross frame elements.

Figure 5:
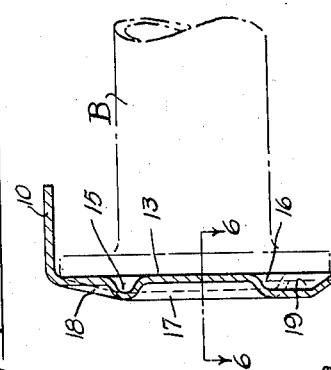
Fig. 5 is a transverse cross sectional view through the intermediate fragment, as indicated by the line 5—5 on Fig. 3, and indicating conventionally the end portion of a cross frame brace.

When making the frame of light metal, it is found that no greater flange widths are effective than those previously used from the standpoint of side and torsional strain resistance. In order to overcome this difficulty, I provide in effect intermediate flanges and auxiliary reinforcements, as will now be described. Referring to Figs. 2 to 4 wherein the top flange of the channel is indicated at 10, the bottom flange at 11, and the web at 13, the web reinforcement consists of depressions in the nature of ribs pressed out of the general plane of the web, and preferably in the opposite direction from the upper and lower flanges as shown in Fig. 5. As shown in this figure, there are two longitudinal ribs designated 15 and 16, connected by cross ribs 17 and joined above and below by cross or joining ribs 18 and 19 respectively, all the ribs being preferably pressed out in a direction opposite the flanges. Comparison of Figs. 2 to 4 with the diagram shows that the double reinforcement, that is, by two ribs, such as 15 and 16, continue throughout that region of the beam where the resultant bending moments are greatest.

It will be noted in Fig. 2 that there is only one longitudinal rib at the forward end of the channel. This is designated 19 and is joined by cross or joining ribs designated 20 and 21. A portion of the web adjacent the ribbed structure just described is uncorrugated and has openings, such as 25, for receiving bolts or rivets for the forward engine support pads. The single rib 19 begins again rearwardly of these holes 25, and is displaced by two ribs 15 and 16 with connecting ribs 17 as described and upper and lower joining ribs 18 and 19 as described. The rib 15 may be considered a continuation of the rib 19. This formation continues substantially throughout the entire deeper portion of the beam, except that certain of the ribs are left out as in the region 27 for the rear end shackle of the front spring and in the region 28 for the steering gear mountings. It will be noted that in the case of the shackle support region 27 and the steering gear region 28, certain of the longitudinal ribs continue; that is to say, the rib 15 continues on past the region 27, while the rib 16 begins below the region 28 and carries through beyond this region at which there are again two longitudinal ribs joined by diagonally extending cross ribs 17, 18 and 19 as before. In Fig. 3 the group of holes 29 are arranged to receive rivets for the flanges of a cross brace such as shown in broken lines in Fig. 5 at B. This is given as an example of cross bracing previously mentioned. The other end of such cross brace is secured in like manner to the corresponding side frame element at the other side of the chassis.

The rear cross frame members may be secured at groups of holes 30, 31 and 32 the ribbing being entirely left out only at the extreme rear end in the region of the holes 32, where the vertical bending loads are least and where the torsional loads are amply resisted by a heavy cross member such as a flanged tube. There is throughout the frame element described, either a continuation of longitudinal ribs or else the beam is so supported by cross members, such as engine support brackets, cross ties, etc. that the longitudinal ribbing may be omitted without weakening the frame.

At the region between the lead lines of the numeral 30, Fig. 4, the web of the rail is embossed with a substantially X-shaped rib to impart requisite strength where spring reaction from the rear springs is quite severe.

In connection with the cross ribbing, I wish to point out that in most cases where there are ribs intermediate a pair of longitudinal ribs, such as 15 and 16, as well as upper and lower joining ribs such as 18 and 19, these cross ribs incline first forwardly and then rearwardly in the manner of the usual lattice work composite beam structure, while the joining ribs 18 and 19 are variously inclined, some forwardly from the upper and lower longitudinal ribs and some rearwardly. Also it will be noted that in practically no case is there a rib 18 or 19 in alignment with the intermediate rib 17, but instead these ribs 18 and 19 are offset longitudinally from the adjacent ribs 17. This is in order that the metal at only one side of a longitudinally extending rib shall be weakened at a given point by pressing out a cross rib. In ordinary structural iron work, this would not be necessary because the lattice members would not be made by punching out cross members from sheet metal, but when the lattice work effect is obtained as in the present instance, the factor of weakening the metal in the pressing operation becomes highly important.

I claim:

1. A vehicle frame structure comprising side frame and cross frame members, the side members being of sheet metal and having webs and flanges, and the cross members being rigidly secured at their ends to the webs of respective side members, the webs having alternate embossed and blank portions, the embossed portions comprising interconnected directionally intersecting ribs intermediately of the points at which the cross members are secured, said cross members being secured at the blank portions.

2. A sheet metal beam having a web portion with longitudinally extending ribs disposed inwardly from its top and bottom boundary lines and substantially parallel therewith and having spaced diagonal cross ribs integrally connected with the longitudinal ribs.

3. A reinforced sheet metal frame member for a motor vehicle, comprising a strip of metal having a web and flanges, there being longitudinally extending ribs on the web disposed inwardly from the flanges, there being cross ribs formed in the web and joining the first-named ribs, to provide a cantilever bracing for vertical loads, said cross ribs abutting and thus bracing the longitudinal ribs to strengthen the frame against torsional strains.

4. A sheet metal beam having a web portion, said web portion having longitudinally extending ribs disposed inwardly from its top and bottom boundary lines, there being spaced diagonal cross ribs connecting with the longitudinally extending ribs, and there being other cross ribs offset from the first-mentioned cross ribs and extending from respective longitudinal ribs toward said boundary lines.

5. A vehicle frame structure comprising side frame and cross frame members, the side members being of sheet metal and having vertical webs and substantially horizontal flanges, and the cross members being secured at their ends to the webs of respective side members and bracing the members at such points, the webs being longitudinally ribbed intermediately of the cross members and the said ribs being interconnected by other transversely extending ribs forming therewith a cantilever bracing.

6. A side frame member for a motor vehicle, comprising a strip of sheet metal having flanges at its upper and lower portions and spaced apart longitudinal ribs intermediate of the flanges, the said ribs being joined by diagonally extending spaced cross ribs, there being other ribs extending from the first mentioned ribs toward the flanges, certain of said other cross ribs being offset longitudinally of the frame from adjacent first mentioned cross ribs.

7. A side frame channel member of a motor vehicle, having portions of greater and lesser depth and having longitudinally extending ribs formed in the web thereof, the ribs converging toward each other as the depth of the channel decreases, there being cross ribs joining the longitudinally extending ribs, and forming therewith a cantilever bracing for the channel member.

8. A side frame member for a motor vehicle having a web and flanges, a rib formed in the web and extending longitudinally throughout substantially the entire length thereof and substantially parallel to its flanges, and cross ribs formed in the web and extending from opposite sides of the longitudinal rib toward the edge flanges.

9. A side frame member of a motor vehicle having portions of greater and lesser depth, a pair of substantially parallel ribs formed in the web in the portions of greater depth and extending longitudinally thereof, and a single rib formed in the web in the portion of lesser depth and extending longitudinally thereof.

10. A side frame member of a motor vehicle having portions of greater and lesser depth, a pair of substantially parallel ribs formed in the web in the portions of greater depth and extending longitudinally thereof, and a single rib formed in the web of the portion of lesser depth and extending longitudinally thereof to form substantially a continuation of one of said first mentioned longitudinal ribs.

11. A side frame member for a motor vehicle constructed of comparatively thin stock and having a web and flanges, said web being internally braced by directionally intersecting ribs formed from the metal of the web, certain regions of the web, being uninterrupted by said intersecting ribs for the attachment of cross frame members, and said ribs including a longitudinally extending rib substantially paralleling said flange and extending substantially the entire length of said side frame member, said longitudinally extending rib extending across those regions devoid of intersecting ribs.

12. A side frame member of a motor vehicle having a pair of longitudinally extending ribs arranged substantially at opposite sides of its neutral axis, and transverse ribs connecting the same.

13. A motor vehicle side rail comprising an elongated member having a web and top and bottom flanges, said member having a narrower kick-up portion, the web of said kick-up portion having curved regions thereof provided with transversely extending ribs, and a rib extending lengthwise of the kick-up portion and intersecting the transversely extending ribs.

WM. A. McKINLEY.